(12) United States Patent
Walker et al.

(10) Patent No.: US 7,184,207 B1
(45) Date of Patent: Feb. 27, 2007

(54) SEMICONDUCTOR OPTICAL DEVICE (75) Inventors: Robert Graham Walker, Northampton (GB); Kelvin Prosyk, Ottawa (CA)

(73) Assignee: Bookham Technology PLC, Towcester (GB)

( * ) Notice: Subject to any disclaimer, the term of this patent is extended or adjusted under 35 U.S.C. 154(b) by 0 days.

(21) Appl. No.: 11/315,415

(22) Filed: Dec. 21, 2005

Related U.S. Application Data (63) Continuation-in-part of application No. 11/267,400, filed on Nov. 3, 2005, which is a continuation-in-part of application No. 11/237,067, filed on Sep. 27, 2005.

(51) Int. Cl.
*H01S 3/00* (2006.01)
(52) U.S. Cl. .................................. 359/344; 372/50.22
(58) Field of Classification Search ................ 359/344; 372/50.22
See application file for complete search history.

(56) References Cited

U.S. PATENT DOCUMENTS

| 5,444,803 | A |  | 8/1995 | Kim et al. |
| 5,799,119 | A |  | 8/1998 | Rolland et al. |
| 6,111,998 | A |  | 8/2000 | Ido et al. |
| 6,148,132 | A |  | 11/2000 | Hamamoto |
| 6,571,038 | B1 |  | 5/2003 | Joyner et al. |
| 6,668,103 | B2 |  | 12/2003 | Hosoi |
| 6,813,068 | B2 | * | 11/2004 | Hamamoto ............... 359/344 |
| 2003/0021514 | A1 |  | 1/2003 | Ito et al. |
| 2003/0113063 | A1 |  | 6/2003 | Liu |

FOREIGN PATENT DOCUMENTS

| EP | 0881512 A2 |  | 12/1998 |
| GB | 2367377 A | * | 4/2002 |
| WO | WO-02/31556 A1 |  | 4/2002 |
| WO | WO-02/31587 A2 |  | 4/2002 |

OTHER PUBLICATIONS

Bernard, Jean-Jacques, et al., "Semiconductor Optical Amplifiers," Spies's oemagazine, Sep. 2001, pp. 36-38.
Eldada, Louay, "Telecom Integrated Optic Components and Subsystems," Telephotonics Inc., http://www.cir-optical.com/CIROpticspapers.htm, reflecting information known at least as early as Oct. 29, 2001, 8 pages.

(Continued)

*Primary Examiner*—Mark Hellner
(74) *Attorney, Agent, or Firm*—Lahive & Cockfield LLP; Anthony A. Laurentano, Esq.

(57) ABSTRACT

An optical device comprises a semiconductor structure including first and second ridge waveguides, each waveguide comprising a ridge extending across a surface of the semiconductor structure. The ridge of the first waveguide has a first height above a first region of the surface, and the ridge of the second waveguide has a second, greater, height above a second region of the surface. The semiconductor structure includes a multimode interference (MMI) region situated between the first and second ridge waveguides, which provides a transition between them. At least a part of the MMI region is tapered in width and/or at least a part of the first and/or second ridge waveguide is tapered in width in a direction extending away from the MMI region.

20 Claims, 4 Drawing Sheets

OTHER PUBLICATIONS

Hamamoto, K. et al. "Active multi-mode-interferometer semiconductor optical amplifier" Electronics Letters, Jul. 6, 2000 vol. 36 No. 14 pp. 1218-1220.

Jalali, B., et al., "Advances in Silicon-on-Insulator Optoelectronics," *IEEE Journal of Selected Topics in Quantum Electronics*, vol. 4(6):968-947 (1998).

Jenkins, R.M., "A Novel Waveguide Mach-Zehnder Interferometer Based on Multimode Interference Phenomena," Optics Communications 110 (1994) pp. 410-424.

Leuthold, J., et al., "Spatial Mode Filters Realized with Multimode Interference Couplers," *Optics Letters*, vol. 21(11):836-838 (1996).

Kim, H.S., et al., "Square Ring Laser Diode with MMI Coupler Cavity," *IEEE Photonics Technology Letters*, vol. 9(5):584-586 (1997).

Kudo, Koji, et al., "1.55 μm Wavelength-Selectable Microarray DFB-LD's with Integrated MMI Combiner, SOA, and EA-Modulator," *IEEE Photon. Techn. Lett.*, vol. 242:190-192 (2000).

Leuthold, J., "Spatial Mode Filters Realized with Multimode Interference Couplers," 1996 Optical Society of America, No. 11, Jun. 1, 1996, pp. 836-838.

Pennings, E.C.M., et al., "Reflection Properties of Multimode Interference Devices," *IEEE Pnotonics Technology Letters*, vol. 6(6):715-718 (1994).

Soldano, Lucas B., et al., "Optical Multi-Mode Interference Devices Based on Self-Imaging: Principles and Applications," *Journal of Lightwave Technology*, vol. 13(4):615-627 (1995).

Uemakai, M., et al., "Tunable External-Cavity Semiconductor Laser Using Monolithically Integrated Tapered Amplifier and Grating Coupler for Collimation," *IEEE Photonics Technology Letters*, vol. 12(12):1607-1609 (2000).

van Dam, C., et al., "Compact Spatial Mode Filter Based on a MMI Coupler," J.J.M. Annual Symposium-IEEE Leos Benelux Chapter 1996 1st, pp. 112-115.

International Search Report Application No. PCT/GB03/00605.

\* cited by examiner

Fig. 8

SEMICONDUCTOR OPTICAL DEVICE

RELATED APPLICATION

This application is a Continuation-in-part of U.S. patent application Ser. No. 11/267,400 filed Nov. 3, 2005, which is a Continuation-in-part of U.S. patent application Ser. No. 11/237,067 filed Sep. 27, 2005.

FIELD OF THE INVENTION

The present invention relates to semiconductor optical devices, and especially to integrated semiconductor optical devices in which a plurality of optically coupled components are fabricated in the same semiconductor structure (e.g. on the same semiconductor chip). The invention particularly concerns semiconductor optical devices including ridge (or rib) waveguides. (A ridge waveguide comprises a ridge extending across a surface of a semiconductor structure.)

BACKGROUND ART

A ridge waveguide typically comprises material remaining from an original uniform multi-layered planar waveguide whose layers are designed to confine light in-plane. The ridge is typically created by means of a selective etching process used to excavate material from either side of the ridge. In common parlance, a strong waveguide results from excavation at least deep enough to completely expose the optical guided-mode to the walls of the ridge. A weak waveguide results from a less-deep excavation in which a high refractive index 'core' layer (which confines the optical mode vertically) is not removed. Typically, for a weak waveguide the excavation is stopped at or above the upper boundary of this core layer, and for a strong waveguide the excavation is stopped beneath the lower boundary of this core layer, usually such that the level of the peak intensity of an optical mode guided by the waveguide falls within the ridge. However, the strength of lateral confinement of a ridge waveguide may be graded continuously from zero through weak to strong as a function of the etch depth. There are differing advantages and disadvantages to each type, and it may be desired to use both for different purposes within a single optical guided-wave device.

An optical mode that is transmitted along a composite waveguide in which a weak waveguide and a strong waveguide are butt-coupled is partially reflected from the interface between the two types of waveguide, producing back-scattering.

International patent application WO 02/31587 discloses integrated semiconductor optical devices, in which a ridge waveguide includes a guided wave spatial filter for filtering out optical radiation modes that are higher-order than the fundamental optical radiation mode. The guided wave spatial filter comprises a section of the ridge waveguide having relatively deeply etched regions on each side of the ridge of the waveguide, in comparison to main sections of the ridge waveguide in which there are relatively shallowly etched regions on each side of the ridge of the waveguide. In two disclosed versions, the devices include a mixing region fabricated in a relatively deeply etched region.

SUMMARY OF THE INVENTION

The present invention seeks to provide semiconductor optical devices in which a transition between a ridge waveguide having a relatively low ridge (e.g. a shallowly etched ridge) and a ridge waveguide having a relatively high ridge (e.g. deeply etched ridge) causes minimal back-scattering (e.g. reflection) of light. The suppression of back-scattering is often important, because back-scattered light can adversely affect the operation of optical components (e.g. lasers). A transition between a relatively low ridge, and a relatively high ridge, of a ridge waveguide can cause significant back-scattering of light. However, it can be advantageous to have ridge waveguides with different height ridges (i.e. ridges etched to different depths) fabricated on one and the same semiconductor optical device, because the heights of the ridges can be tailored to the needs of different optical components integrated in the device, e.g. a waveguide laser and an optical modulator. In such devices, for example, it can be advantageous for the ridge waveguide of the laser to have relatively shallowly etched regions on each side of the ridge of the waveguide (and thus for the ridge to have a relatively low height), so that undesirable consequences of etching through the laser's active layer can be avoided. It can also be advantageous for the ridge waveguide of the optical modulator to have a ridge that extends relatively high above the floor of an etched trench on each side of the ridge (e.g. by etching relatively deeply on each side of the ridge), so that the light is strongly laterally confined through the modulator, and therefore the modulator can efficiently modulate substantially the entire optical mode. This is just one of many possible advantages of having coupled ridge waveguides with differing ridge heights.

Accordingly, a first aspect of the present invention provides an optical device comprising a semiconductor structure including first and second ridge waveguides, each waveguide comprising a ridge extending across a surface of the semiconductor structure, the ridge of the first waveguide having a first height above a first region of the surface, and the ridge of the second waveguide having a second, greater, height above a second region of the surface, the semiconductor structure including a multimode interference (MMI) region situated between the first and second ridge waveguides and providing a transition between them, and wherein: (a) at least a part of the MMI region is tapered in width; and/or (b) at least a part of the first and/or second ridge waveguide is tapered in width in a direction extending away from the MMI region.

The first aspect of the invention has the advantage that light propagating between the first and second ridge waveguides is able to negotiate the transition in ridge height without significant back-scattering, by means of a combined effect of "re-imaging" within the multimode interference region and guidance by means of the tapering of the MMI region and/or the ridge waveguide(s).

In preferred embodiments of the invention, the MMI region comprises a ridge of a ridge waveguide, the ridge extending across a region of the surface of the semiconductor structure.

As used herein, the term "width" with regard to the MMI region and/or the ridge waveguide(s) refers to a lateral dimension substantially perpendicular to a longitudinal axis of the MMI region and/or the ridge waveguide(s) and substantially parallel to the surface of the semiconductor structure. The semiconductor structure preferably comprises a semiconductor chip.

Preferably, at least a part of the MMI region is tapered in width in a direction extending towards the second ridge waveguide. In some embodiments, substantially the entire MMI region is tapered in width in a direction extending towards the second ridge waveguide. Additionally or alternatively, at least a part of the ridge of the first ridge waveguide and/or the second ridge waveguide immediately adjacent to the MMI region, may be tapered in width.

In preferred embodiments of the invention, the first ridge waveguide is a relatively weakly guiding waveguide, and the second ridge waveguide is a relatively strongly guiding waveguide. Consequently, it is preferred that at least a part of the ridge of the first ridge waveguide is wider than at least a part of the ridge of the second ridge waveguide. More preferably, at least a part of the ridge of the first ridge waveguide immediately adjacent to the MMI region is wider than at least a part of the ridge of the second ridge waveguide immediately adjacent to the MMI region.

In most embodiments of the invention, the above-mentioned surface of the semiconductor structure has at least two levels, the first region of the surface being at a first level and the second region of the surface being at a second level, the second level being lower than the first level. This "surface" of the semiconductor structure will normally be the "floor" of etched regions of the semiconductor structure, the etched regions having been etched to differing depths which define the levels of the surface. Thus, a top face of the ridge of the first ridge waveguide and a top face of the ridge of the second ridge waveguide may be substantially co-planar, the difference in the heights of the two ridges being determined (at least in part) by the differing levels of the surface of the semiconductor structure. A top face of the MMI region may (or may not) be substantially co-planar with one or both of the top face of the ridge of the first ridge waveguide and the top face of the ridge of the second ridge waveguide. It is generally not necessary for correct optical functioning, for the top faces of the ridge waveguides and/or the MMI region to be co-planar, because there is normally very little of the light propagating through the device that is present at such top faces. (However, as a consequence of the fabrication processes such top faces often will be approximately level.) The light is guided primarily by one or more core layers of the waveguides, which core layers are spaced below the top faces and have a higher refractive index than layers above and below them. It is generally important for such core layers of the waveguides and/or the MMI region to be substantially aligned.

Preferably, at least part of the MMI region extends across a part of at least the second region of the surface of the semiconductor structure. For example, substantially the entire MMI region may extend across a part of the second region of the surface of the semiconductor structure. Alternatively, the MMI region may extend across parts of both first and second regions of the surface of the semiconductor structure.

It can be advantageous for a substantially non-etched region (which may be termed a "buffer zone") of the semiconductor structure to be situated between the first and second regions of the "surface" of the semiconductor structure. Because the MMI region generally extends across part of the second region, the non-etched region will generally be situated between the first ridge waveguide and the MMI region. The two differing levels of the first and second regions will normally be fabricated in two separate etching steps, which might (if a buffer zone is not present) produce an unintended double-etched region between them due to accidental overlapping of the etched regions. In order to avoid such a double-etched region (and to avoid any adverse optical consequences of it) an non-etched buffer zone may be provided between the first and second regions of the "surface" of the semiconductor structure, so as to separate the two different etch-depths. Also, the MMI region and the second ridge waveguide may, at least for some devices, be fabricated on a second semiconductor material that has been "re-grown" in regions from which a first semiconductor material has been selectively etched away. An interface between the first and second (re-grown) semiconductor materials may advantageously be located within the non-etched buffer zone.

The first ridge waveguide may function as an input waveguide for the MMI region, in which case the second ridge waveguide functions as an output waveguide for the MMI region. That is, in use, light may propagate along the first ridge waveguide, then though the MMI region, and then along the second ridge waveguide. However, in other uses or embodiments of the invention, the direction of light propagation may be the reverse of this, and thus the second ridge waveguide will be an input waveguide and the first ridge waveguide will be an output waveguide.

The first and/or second ridge waveguide preferably is a single-mode waveguide. The MMI region will generally be wider than the first and/or second ridge waveguides.

The MMI region may be designed for 1 to 1 re-imaging, i.e. with the first and second ridge waveguides being the only input/output waveguides for the MMI region. Alternatively, the MMI region may be a 2×1 combiner, i.e. with two input waveguides and a single output waveguide, or 1×2 splitter with two output waveguides and a single input waveguide. As a further alternative, the MMI region may be a 2×2 MMI region, i.e. with two input waveguides and two output waveguides. More generally, the MMI region may be an M×N MMI region, i.e. with any number of input waveguide(s) and output waveguide(s). However, the invention is presently envisaged primarily in terms of a transition between only two waveguides, namely the first and second ridge waveguides.

In some preferred embodiments of the invention, the device may further comprise a first electrode associated with the MMI region and/or associated with one or both of the first ridge waveguide and the second ridge waveguide. The electrode is arranged to apply an electric field (preferably a variable electric field) to the MMI region and/or to the first ridge waveguide and/or to the second ridge waveguide, thereby to cause absorption of light propagating therethrough. Consequently, the device may advantageously comprise an optical attenuator or an optical modulator, for example.

The MMI region and/or one or both of the first ridge waveguide and the second ridge waveguide may advantageously include one or more active regions in which variations in the electric field applied by the first electrode cause variations in absorption of light, and one or more passive regions (e.g. electrically insulating or semi-insulating regions) in which variations in the electric field applied by the first electrode cause substantially no variations in any absorption of light. Preferably, relative proportions of the MMI region and/or waveguide(s) that comprise the active and passive regions vary along at least part of the length of the MMI region and/or waveguide(s). By means of the variation in the relative proportions of the MMI region and/or waveguide that comprise the active and passive regions, the optical absorption profile along the MMI region and/or waveguide may be altered in a predetermined, controlled, way. In particular, the use of such active and passive regions may enable a peak in the optical absorption profile to be reduced in height (e.g. flattened), thereby reducing the amount of heat generated by the optical absorption. Such a reduction in heat generation can be highly advantageous because excessive heat generation can cause catastrophic optical damage ("COD") and reduced reliability, for example.

A second aspect of the invention provides a semiconductor optical device comprising a plurality of optical devices according to the first aspect of the invention integrated onto one and the same semiconductor structure.

BRIEF DESCRIPTION OF THE DRAWINGS

Some preferred embodiments of the present invention will now be described, by way of example, with reference to the accompanying FIGS. 1 to 7, of which.

DETAILED DESCRIPTION OF THE EMBODIMENTS

Figure 1:
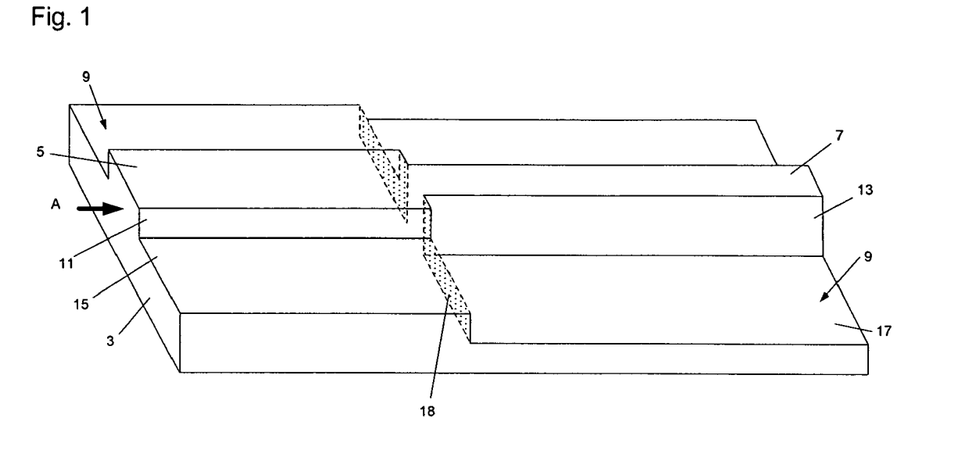
FIG. 1 shows, schematically, an illustration of device according to the prior art.
Figure 2:
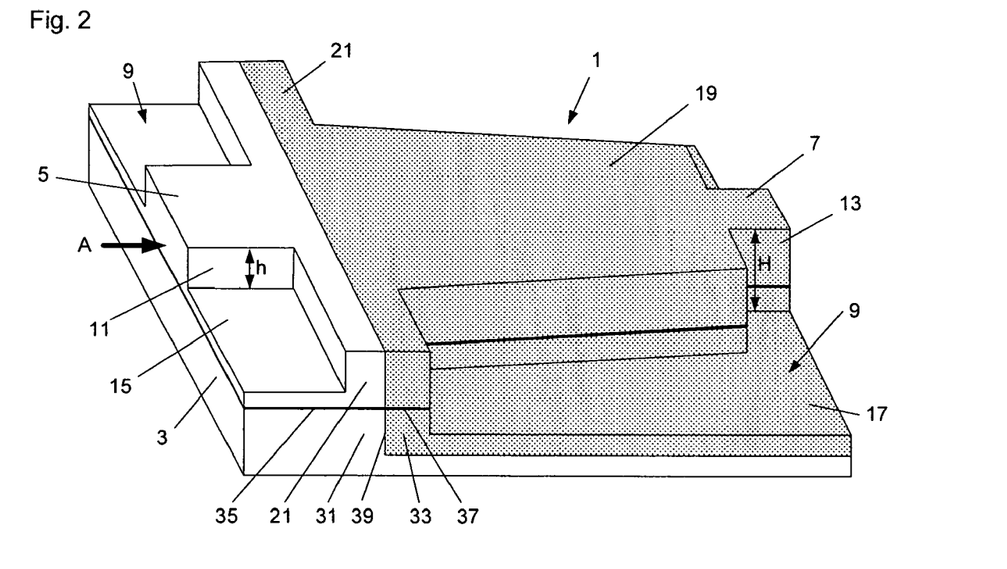
FIG. 2 shows, schematically, a first embodiment of the invention.

FIG. 1 shows, schematically, a known (prior art) type of optical device. FIG. 2 shows, schematically, an embodiment of an optical device 1 according to the present invention. Both the known type of optical device shown in FIG. 1, and the embodiment of the invention shown in FIG. 2 comprise a semiconductor structure 3 including a first ridge waveguide 5 and a second ridge waveguide 7. Each of the ridge waveguides comprises a ridge extending across a surface 9 of the semiconductor structure. The ridge 11 of the first ridge waveguide 5 has a first height h above a first region 15 of the surface 9 of the semiconductor structure. The ridge 13 of the second ridge waveguide 7 has a second, greater, height H above a second region 17 of the surface. The difference in heights between the ridges 11 and 13 is due to a difference in levels between the first and second regions 15 and 17 of the surface 9 of the semiconductor structure, i.e. the first region 15 is at a higher level than the second region 17. Additionally, the ridge 11 of the first ridge waveguide 5 is wider than the ridge 13 of the second ridge waveguide 7. Core guiding layers 35 and 37 (see FIG. 2) of the first and second waveguides 5 and 7 are substantially aligned vertically; the purpose of the two levels of the first and second regions 15 and 17 is to provide a transition between the different degrees of lateral confinement, i.e. the different widths of the first and second ridges. (As mentioned above, the widths are measured in a direction perpendicular to a longitudinal axis of each waveguide and parallel to the surface 9—and thus perpendicular to the height. In the devices illustrated in FIGS. 1 and 2, the first and second ridge waveguides are collinear, with their longitudinal axes indicated by the arrow A, which shows the direction of propagation of light, in use.) The first ridge waveguide 5 is a weakly guiding waveguide, and the second ridge waveguide 7 is a strongly guiding waveguide. The first ridge waveguide may, for example, comprise the waveguide of a laser fabricated on the semiconductor structure 3 "upstream" of the second ridge waveguide (and not shown). The second ridge waveguide may, for example, comprise the waveguide of an optical modulator fabricated on the semiconductor structure 3 "downstream" of the first ridge waveguide (and also not shown).

An optical mode that is transmitted along the first and second ridge waveguides 5 and 7 of the known type of device illustrated in FIG. 1 will be partially reflected from the interface 18 between the two waveguides, producing back-scattering. In order to solve this problem, the semiconductor structure 3 of the embodiment of the present invention shown in FIG. 2 includes a multimode interference (MMI) region 19 situated between the first and second ridge waveguides 5 and 7, which provides a transition between the first and second ridge waveguides. The MMI region 19 is tapered in width W in a direction extending towards the second ridge waveguide 7. The top faces of the first ridge waveguide, MMI region and second ridge waveguide may all be co-planar (as illustrated), but this is not necessarily the case. As indicated above, horizontal planes of peak optical intensity (in practice the middles of core guiding layers 35 and 37) in the first and second ridge waveguides and the MMI region preferably are substantially co-planar. The first ridge waveguide 5 comprises an input waveguide for the MMI region 19, as indicated by the arrow A. The second ridge waveguide 7 comprises an output waveguide for the MMI region. The first ridge waveguide 5 meets the MMI region 19 via an optional "buffer zone" 21 of the MMI region. The buffer zone 21 is shown as a portion of the semiconductor structure 3 that is wider than the MMI region; this is because the buffer zone comprises a non-etched region of the semiconductor structure (the features of the structure being defined by etching selected portions of the structure, as generally known in the art). As mentioned above, the two differing levels of the first and second regions 15 and 17 will normally be fabricated in two separate etching steps, which might (if a buffer zone is not present) produce an unintended double-etched region between them due to accidental overlapping of the etched regions. In order to avoid such a double-etched region (and to avoid any adverse optical consequences of it) the non-etched buffer zone is provided between the first and second regions, in order to separate the two different etch-depths. Also, the MMI region and the second ridge waveguide may, at least for some devices, be fabricated on a second semiconductor material 33 that has been "re-grown" in regions from which a first semiconductor material 31 has been selectively etched away. An interface 39 between the first and second (re-grown) semiconductor materials may advantageously be located within the non-etched buffer zone 21.

The embodiment of the invention shown in FIG. 2 has the advantage that light propagating between the first and second ridge waveguides 5 and 7 is able to negotiate the transition in ridge height (caused by the transition in the height of the semiconductor surface 9) without significant back-scattering into the first waveguide 5 (e.g. reflection), by means of a combined effect of "re-imaging" within the multimode interference region 19 and guidance by means of the tapering of the MMI region. The inventors of the present invention have found that by means of the combination of the re-imaging provided by an MMI region, and the tapering of either the MMI region or the second ridge waveguide (or both) in the direction of propagation of the light, the transition between the first and second ridge waveguides can produce minimal back-scattering. It is believed that any back-scattering that may occur is not efficiently coupled back into the first ridge waveguide (due to the re-imaging caused by the MMI region and the tapering of the MMI region and/or the second ridge waveguide).

Figure 3:
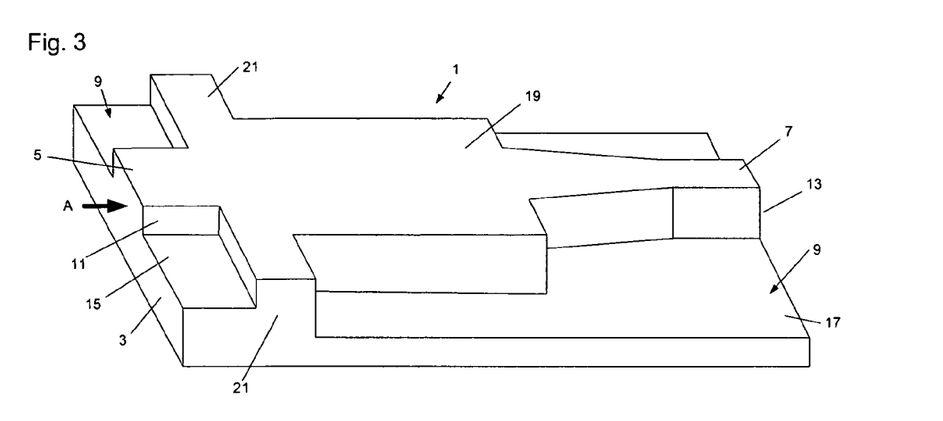
FIG. 3 shows, schematically, a second embodiment of the invention.

The embodiment of the invention illustrated schematically in FIG. 3 is similar to that illustrated in FIG. 2, except that the MMI region 19 is not tapered, whereas the second ridge waveguide 7 is tapered. In particular, the second ridge waveguide 7 is tapered in width in the direction of propagation of the light (as indicated by arrow A) along a part of the second ridge waveguide that is immediately adjacent to the MMI region 19.). This is because a non-tapered MMI region will re-image an incident optical mode at its output without compressing the mode. Thus, a strongly guiding output waveguide 7 generally needs to be of similar initial width (adjacent to the MMI region) to the input waveguide 5, tapering down to the desired narrower width as the waveguide extends away from the MMI region.

It is to be understood (as mentioned above) that any and all embodiments of the invention may include a tapered part of the second ridge waveguide (e.g. as illustrated in FIG. 3). Thus, for example, the embodiment illustrated in FIG. 2 could also include a tapered part of the second ridge waveguide, e.g. as shown in FIG. 3. Additionally or alternatively, any and all embodiments of the invention may include a tapered part of the first ridge waveguide, preferably immediately adjacent to the MMI region, and preferably tapering in a direction away from the MMI region (i.e. tapering in the opposite direction to any tapering of the second ridge waveguide).

For those embodiments of the invention (e.g. those illustrated in FIGS. 1 and 2) in which the MMI region includes an end face adjacent to the second ridge waveguide 7, from which the second ridge waveguide projects, the end face on each side of the second ridge waveguide may be substantially perpendicular to the longitudinal axis of the second ridge waveguide. Alternatively, however, the end face on one or both sides of the second ridge waveguide (and/or the first ridge waveguide) may be angled such that it is not perpendicular to the longitudinal axis of the second ridge waveguide (e.g. an internal angle within the MMI region between the end face and the longitudinal axis may be less than 90 degrees). Such angling can assist in the suppression of back-scattering from the MMI region. Similar angling may, or may not, be present at the opposite end face of the MMI region adjacent to the first ridge waveguide 5.

Figure 4:
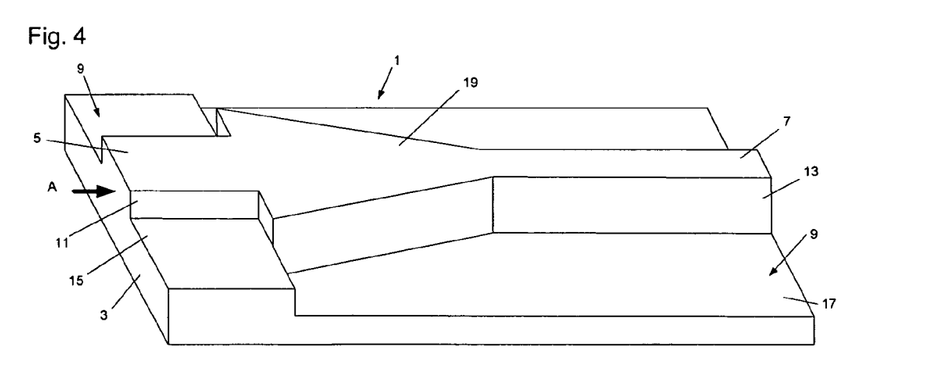
FIG. 4 shows, schematically, a third embodiment of the invention.

FIG. 4 shows a variant of the embodiment of the invention shown in FIG. 2, in which the MMI region 19 tapers directly to the width of the second ridge waveguide 7, and in which the buffer zone 21 is absent. (As indicated above, any or all embodiments of the invention may include a buffer zone 21, or the buffer zone may be absent.) This embodiment may minimise the possibility of back-scatter, though possibly at the expense of absolute transmission efficiency. That is, the absence of shoulders at the output end of the MMI region removes a source of scattering, but by funnelling the multiple modes down to a narrow waveguide some optical power propagating in higher order modes may be at least partially forced out and lost, rather than re-imaging the different orders of optical modes (as generally occurs with the embodiment shown in FIG. 2), and coupling between different orders of modes would occur.

Figure 5:
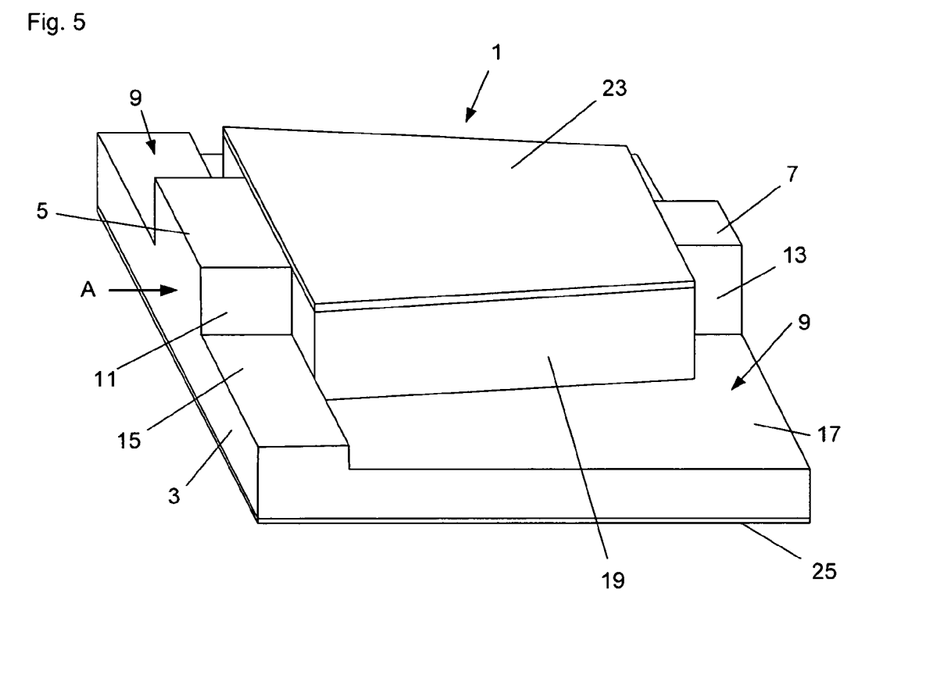
FIG. 5 shows, schematically, a fourth embodiment of the invention.

FIG. 5 shows another variant of the embodiment of the invention shown in FIG. 2, in which the buffer zone 21 is absent. Additionally, in this embodiment, a first electrode 23 is located on the top face of the MMI region 19, and a second electrode 25 (which may be an earth electrode, for example) is located on a bottom surface of the semiconductor structure. The first electrode 23 is arranged to apply a variable electric field to the MMI region 19, in order to cause absorption of light propagating through the MMI region. Consequently, the device shown in FIG. 5 may comprise an optical modulator (especially an electro-absorption modulator) or it may comprise a variable optical attenuator. For example, the MMI region 19 may comprise an optical modulator that is arranged to modulate light generated by a laser (not shown) that is also fabricated on the device (the device being an integrated optical device comprising the laser and the optical modulator). Thus, the light indicated by arrow A, which enters the MMI region via the first ridge waveguide 5, preferably has been generated by an integral laser device situated upstream of the MMI region on the semiconductor optical device 1. An advantage of carrying out optical attenuation in an MMI region rather than in a single mode waveguide, is that the light becomes less confined (i.e. more dispersed) as it enters the MMI region, and this enables the optical power to be absorbed over a larger area of the substrate, improving thermal management. (In an optical attenuator, the optical absorption profile normally includes an intense peak at the input region of the attenuator, where much of the optical absorption takes place. This can generate large amounts of heat, which can cause catastrophic optical damage.)

Figure 6:
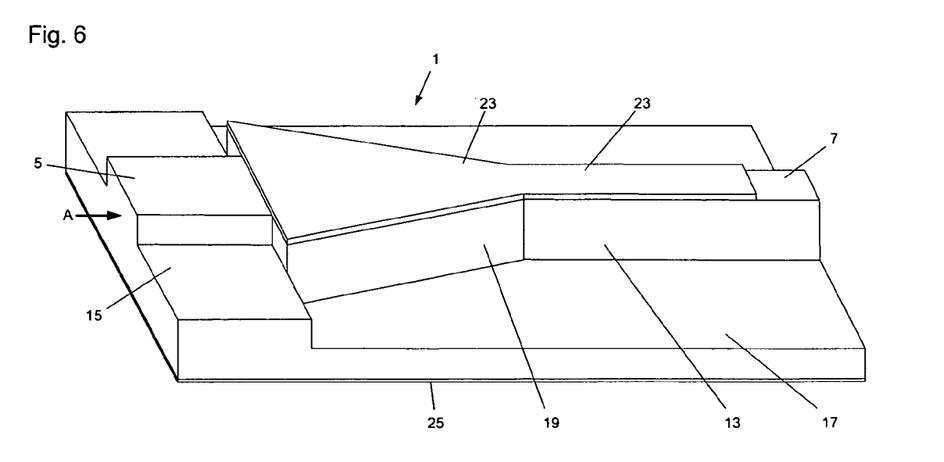
FIG. 6 shows, schematically, a fifth embodiment of the invention.

FIG. 6 shows an embodiment of the invention that is substantially identical to the embodiment illustrated in FIG. 4, except that the embodiment shown in FIG. 6 includes a first electrode 23 and a second electrode 25 (which, again, may be an earth electrode). Similarly to the embodiment illustrated in FIG. 5, the device of FIG. 6 may comprise an optical modulator or a variable optical attenuator (but preferably it is an optical modulator). One difference between the FIG. 5 and FIG. 6 versions is that in the FIG. 6 version the top electrode 23 extends along part of the length of the top face of the second ridge waveguide (in addition to extending over substantially the entire top face of the MMI region). The area of the top electrode 23 in FIG. 6 can be smaller than that in FIG. 5, while providing the same degree of optical modulation, because the region of the top electrode 23 over the second ridge waveguide 7 applies an electric field to a more confined (more "concentrated") region of the light. This can have an advantage over the FIG. 5 version, in that because the top electrode 23 is smaller, the capacitance of the modulator is lower, thereby permitting faster modulation rates, for example. Because the intensity of the light is lower once it reaches waveguide 7, it can be attenuated more compactly without causing excessive heat generation, thereby avoiding the above-described problem of catastrophic optical damage.

Figure 7:
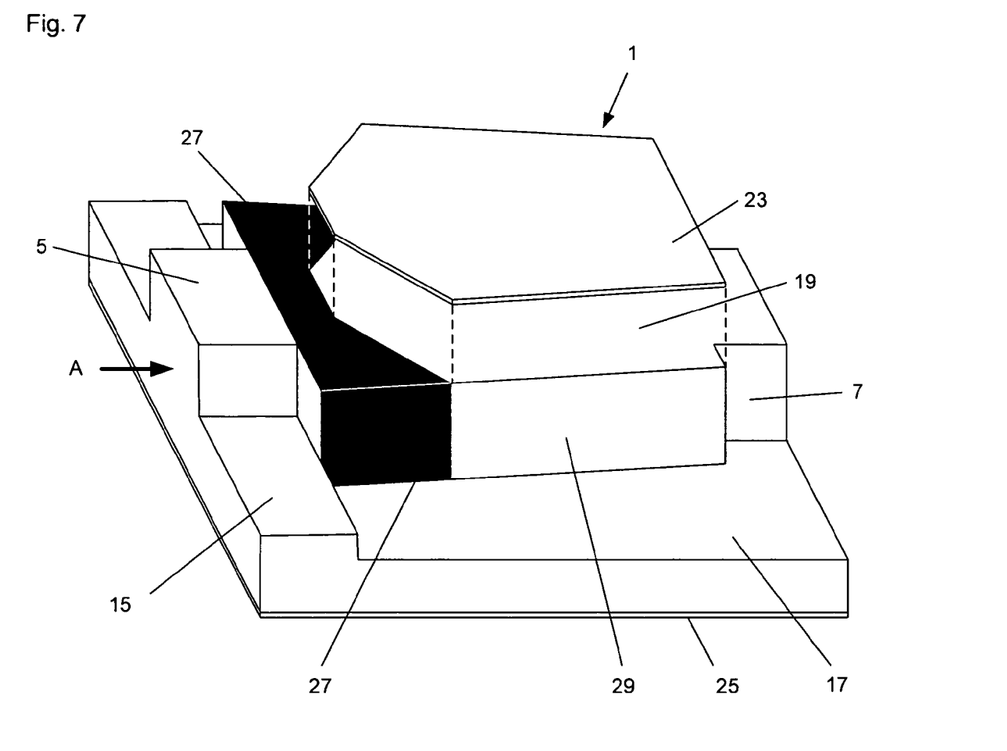
FIG. 7 shows, schematically, a sixth embodiment of the invention.
Figure 8:
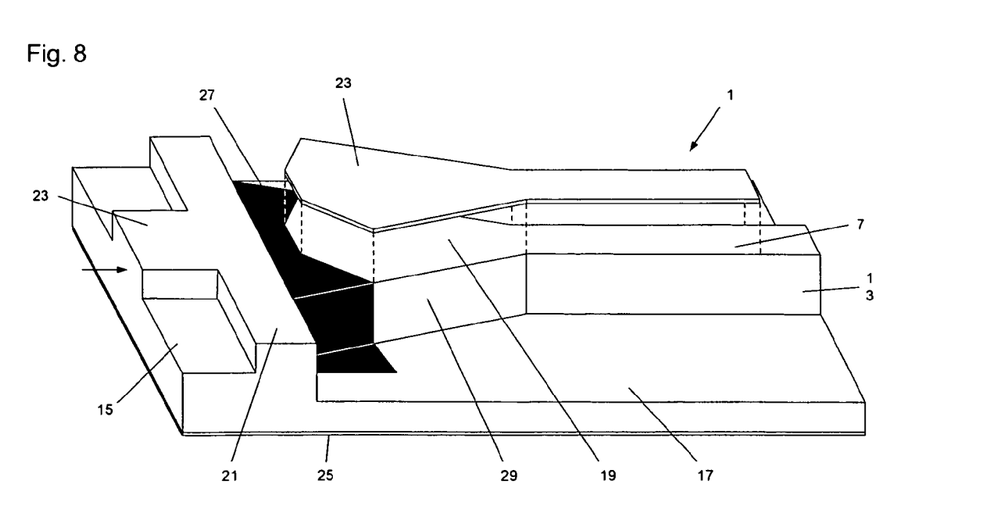
FIG. 8 shows, schematically, a seventh embodiment of the invention.

The embodiments of the invention shown in FIGS. 6 and 7 are variants of the embodiments shown in FIGS. 4 and 5, respectively (except that the FIG. 8 embodiment includes a buffer zone 21, whereas the FIG. 6 embodiment does not). In the embodiments shown in FIGS. 6 and 7, the top electrode 23 is absent from a front part (in the direction of propagation of the light) of the MMI region 19. In each case, the electrode 23 is also shaped such that in the direction of propagation of the light the proportion of the width of the MMI region 19 that the electrode covers increases from a relatively small proportion of the width to the entire width of the MMI region. Additionally, the MMI region 19 includes an active region 29 in which variations in the electric field applied by the first electrode 23 cause variations in absorption of light, and a passive region 27 (the passive region may be generated by any known means, which may include selective ion implantation, selective diffusion, selective area growth, growth and selective etching) in which variations in the electric field applied by the first electrode cause substantially no variations in any absorption of light. As shown, the relative proportions of the width of the MMI region 19 that comprise the active and passive regions vary along part of the length of the MMI region such that the proportion of the width that is passive decreases from the full width to zero. By means of the variation in the relative proportions of the MMI region and/or waveguide that comprise the active and passive regions, the optical absorption profile along the MMI region may be altered in a predetermined, controlled, way. In particular, the use of such active and passive regions may enable a peak in the optical absorption profile to be reduced in height (e.g. flattened), thereby reducing the amount of heat generated by the optical absorption in a corresponding region (e.g. the input region). Such a reduction in heat generation can be highly advantageous because excessive heat generation can cause catastrophic optical damage ("COD") and reduced reliability, for example. (In alternative embodiments, the electrode may be absent from one or more other parts of the MMI region and/or may be shaped in another way, and/or the MMI region may be provided with differently shaped and/or positioned active and passive regions, in order to provide any particular desired optical absorption profile.)

In further aspects of the invention, the integrated semiconductor optical device comprises two (or more) devices according to the first aspect of the invention, in which one device couples light between a relatively strongly guiding waveguide and a relatively weakly guiding waveguide, and the other device couples light between a relatively weakly guiding waveguide (which may, or may not, be the same such waveguide) and a relatively strongly guiding waveguide (which may, or may not, be the same such waveguide).

It will of course be understood that many variations may be made to the above-described embodiments without departing from the scope of the present invention.

The invention claimed is:

1. An optical device comprising a semiconductor structure including first and second ridge waveguides, each waveguide comprising a ridge extending across a surface of the semiconductor structure, the ridge of the first waveguide having a first height above a first region of the surface, and the ridge of the second waveguide having a second, greater, height above a second region of the surface, the semiconductor structure including a multimode interference (MMI) region situated between the first and second ridge waveguides and providing a transition between them, and wherein the device includes one or both of the following: (a) at least a part of the MMI region is tapered in width; (b) at least a part of one or both of the first and second ridge waveguides is tapered in width in a direction extending away from the MMI region.

2. A device according to claim 1, wherein the MMI region comprises a ridge of a ridge waveguide, the ridge extending across a region of the surface of the semiconductor structure.

3. A device according to claim 2, wherein at least part of the MMI region extends across a part of the second region of the surface of the semiconductor structure.

4. A device according to claim 3, wherein substantially the entire MMI region extends across a part of the second region of the surface of the semiconductor structure.

5. A device according to claim 3, wherein the MMI region extends across parts of both first and second regions of the surface of the semiconductor structure.

6. A device according to claim 1, including a substantially non-etched buffer zone of the semiconductor structure situated between the first and second regions of the surface of the semiconductor surface.

7. A device according to claim 1, wherein at least a part of the MMI region is tapered in width in a direction extending towards the second ridge waveguide.

8. A device according to claim 7, wherein substantially the entire MMI region is tapered in width in a direction extending towards the second ridge waveguide.

9. A device according to claim 1, wherein at least a part of the ridge of the first ridge waveguide immediately adjacent to the MMI region is tapered in width.

10. A device according to claim 1, wherein at least a part of the ridge of the second ridge waveguide immediately adjacent to the MMI region is tapered in width.

11. A device according to claim 1, wherein at least a part of the ridge of the first ridge waveguide is wider than at least a part of the ridge of the second ridge waveguide.

12. A device according to claim 11, wherein at least a part of the ridge of the first ridge waveguide immediately adjacent to the MMI region is wider than at least a part of the ridge of the second ridge waveguide immediately adjacent to the MMI region.

13. A device according to claim 1, wherein the surface of the semiconductor structure has at least two levels, the first region of the surface being at a first level and the second region of the surface being at a second level, the second level being lower than the first level.

14. A device according to claim 1, wherein a top face of the ridge of the first ridge waveguide and a top face of the ridge of the second ridge waveguide are substantially coplanar.

15. A device according to claim 1, wherein a top face of the MMI region is substantially co-planar with one or both of a top face of the ridge of the first ridge waveguide and a top face of the ridge of the second ridge waveguide.

16. A device according to claim 1, further comprising a first electrode associated with one or both of: (a) the MMI region; (b) one or both of the first ridge waveguide and the second ridge waveguide; wherein the electrode is arranged to apply an electric field thereto, thereby to cause absorption of light propagating therethrough.

17. A device according to claim 16, further comprising a second electrode situated on an opposite side of the semiconductor structure to the first electrode.

18. A device according to claim 16, wherein the first electrode is arranged to apply a variable electric field.

19. A device according to claim 18, wherein one or any combination of the MMI region, the first ridge waveguide and the second ridge waveguide includes one or more active regions in which variations in the electric field applied by the first electrode cause variations in absorption of light, and one or more passive regions in which variations in the electric field applied by the first electrode cause substantially no variations in any absorption of light.

20. A semiconductor optical device comprising a plurality of optical devices integrated onto one and the same semiconductor structure, wherein each optical device comprises a semiconductor structure including first and second ridge waveguides, each waveguide comprising a ridge extending across a surface of the semiconductor structure, the ridge of the first waveguide having a first height above a first region of the surface, and the ridge of the second waveguide having a second, greater, height above a second region of the surface, the semiconductor structure including a multimode interference (MMI) region situated between the first and second ridge waveguides and providing a transition between them, and wherein the device includes one or both of the following: (a) at least a part of the MMI region is tapered in width; (b) at least a part of one or both of the first and second ridge waveguides is tapered in width in a direction extending away from the MMI region.

* * * * *